United States Patent
Sato

(10) Patent No.: US 7,040,818 B2
(45) Date of Patent: May 9, 2006

(54) DEVICE AND METHOD FOR REINFORCING OPTICAL FIBER FUSION SPLICED PART

(75) Inventor: Ryuichiro Sato, Kanagawa (JP)

(73) Assignee: Sumitomo Electric Industries, Ltd., Tokyo (JP)

(*) Notice: Subject to any disclaimer, the term of this patent is extended or adjusted under 35 U.S.C. 154(b) by 48 days.

(21) Appl. No.: 10/830,451

(22) Filed: Apr. 23, 2004

(65) Prior Publication Data

US 2004/0247261 A1    Dec. 9, 2004

(30) Foreign Application Priority Data

Apr. 23, 2003    (JP) ............... P.2003-118181

(51) Int. Cl.
*G02B 6/255* (2006.01)
(52) U.S. Cl. ............. 385/99; 385/96; 385/136; 385/137
(58) Field of Classification Search ............ 385/95–99, 385/136, 137
See application file for complete search history.

(56) References Cited

U.S. PATENT DOCUMENTS

| | | | | |
|---|---|---|---|---|
| 4,843,209 A | * | 6/1989 | Milligan | 219/121.63 |
| 6,658,182 B1 | * | 12/2003 | Gonthier | 385/43 |
| 6,771,874 B1 | * | 8/2004 | Levert et al. | 385/147 |
| 2002/0124966 A1 | * | 9/2002 | Esmaeili | 156/349 |

FOREIGN PATENT DOCUMENTS

| | | |
|---|---|---|
| JP | 9-21926 | 1/1997 |
| JP | 10-332979 | 12/1998 |
| JP | 11-52163 | 2/1999 |

* cited by examiner

*Primary Examiner*—Brian Healy
*Assistant Examiner*—Jerry Martin Blevins
(74) *Attorney, Agent, or Firm*—McDermott Will & Emery LLP

(57) ABSTRACT

A device for reinforcing an optical fiber fusion spliced part a heating mechanism for heating a protective member and optical fiber clamping mechanisms which are arranged at both sides of the heating mechanism. Relative height positions of the heating mechanism and the optical fiber clamping mechanisms are configured to be changeable.

11 Claims, 5 Drawing Sheets

DEVICE AND METHOD FOR REINFORCING OPTICAL FIBER FUSION SPLICED PART

BACKGROUND OF THE INVENTION

1. Field of the Invention

The present invention relates to a device and a method for reinforcing an optical fiber fusion spliced part which covers the optical fiber fusion spliced part with a sleeve-like protective member having a reinforcing rod and reinforces the optical fiber fusion spliced part by shrinking generated by heating.

2. Description of the Related Art

In the related art, in the fusion splicing of the optical fibers, the fusion splicing is performed by removing fiber coating portions of connecting ends and melting abutting end portions of exposed glass fiber portion by heating. The glass fiber portions which are connected by fusion splicing exhibit a weak mechanical strength and hence, the glass fiber portions are reinforced with a protective member. The protective member is usually constituted by accommodating a heat fusing tube made of a heat-fusing adhesive resin together with a reinforcing rod in the inside of a heat shrinking tube which shrinks in the radial direction by heating (see Japanese Unexamined Patent Publication Hei11 (1999)-52163 and Japanese Unexamined Patent Publication Hei09(1997)-21926, for example).

FIG. 4A and FIG. 4B are views showing a related-art method for reinforcing a fusion spliced part, wherein FIG. 4A is a view showing an example which reinforces a fusion spliced part of a single optical fiber and FIG. 4B is a view showing an example which reinforces a fusion spliced part of an optical fiber ribbon. In the drawing, symbols 1, 1' indicate optical fibers, symbol 2 indicates glass fiber portions, symbol 3 indicate fiber coating portions, symbol 4 indicates a fusion spliced part, symbol 5 indicates a protective member, symbol 6 indicates a heat shrinking tube, symbol 7 indicates a heat fusing tube, symbol 8 indicates a reinforcing rod, symbol 9 indicates a heating platform, symbol 10 indicates a heater, and symbol 11 indicates a heating mechanism.

In the example shown in FIG. 4A which depicts the single optical fibers, the glass fiber portions 2 of the optical fibers 1 is exposed by removing the fiber coating portions 3 at the connecting ends and the fusion splicing is performed by making distal ends thereof abut to each other and connecting them by an arc discharge. The protective member 5 has a length which can cover given ranges of fiber coating portions 3 at both sides of the glass fiber portions 2. The protective member 5 is configured to accommodate the heat fusing tube 7 made of a hot-melt adhesive resin and the reinforcing rod 8 made of stainless steel, glass, ceramics or the like in the inside of the heat shrinking tube 6. The optical fibers 1 which are connected by fusion are inserted into the inside of the heat fusing tube 7 such that the fusion spliced part 4 is positioned as the center of the heat fusing tube 7 and is heated by the heating mechanism 11. The heating mechanism 11 comprises he heating platform 9, the heater 10 and the like. Due to this heating, the heat fusing tube 7 is softened and fused and, at the same time, the heat shrinking tube 6 is shrunken and decreases a diameter thereof in the inner radial direction.

By shrinking the heat shrinking tube 6 and narrowing of the diameter of the heat shrinking tube 6, the heat fusing tube 7 which is fused by heating covers peripheries of the glass fiber portions 2 together with the reinforcing rod 8 such that the heat fusing tube 7 which is fused by melting embeds a space portion in the inside of the heat shrinking tube 6. When the heat shrinking tube 6 and the fused heat fusing tube 7 are cured, the fusion spliced part 4 is protected and is reinforced in a given range including a portion of the fiber coating portions at both sides of the glass fiber portions 2.

Also with respect to an example of the optical fiber ribbon shown in FIG. 4B, in the same manner as the single optical fibers 1, the optical fibers 1 are configured such that the fiber coating portions 3 of the connecting ends are removed to expose glass fiber portions 2 and distal ends of the glass fiber portions 2 are made to abut each other and are collectively connected by fusion splicing using arc discharging or the like. The protective member 5 has a length which allows the protective member 5 to cover given ranges of the fiber coating portions 3 at both sides of the glass fiber portions 2. That is, the protective member 5 is configured such that the heat fusing tube 7 of a hot melt adhesive resin and the reinforcing rod 8 are housed in the inside of the heat shrinking tube 6 having a diameter larger than the heat shrinking tube 6 of the single optical fiber 1.

The heat fusing tube 7, for example, is formed into an elliptical shape and has a shape and a size which allow the heat fusing tube 7 to house a large number of optical fibers arranged in parallel in a row, while the reinforcing rod 8 is also formed such that the reinforcing rod 8 has a semicircular shape and has a diameter which allows the optical fibers to be arranged in a row on a flat surface thereof. Then, in the same manner as the constitution shown in FIG. 4A, the optical fibers 1' which are to be connected by fusion splicing are inserted into the inside of the heat fusing tube 7 such that the fusion spliced part 4 is positioned at the center of the heat fusing tube 7. These components are heated by the heating mechanism 11 which comprises the heating platform 9, the heating heater 10 and the like. Due to such heating, the heat fusing tube 7 can be softened and fused and, at the same time, the heat shrinking tube 6 can be shrunken and the diameter of the heat shrinking tube 6 can be narrowed in the inner radial direction.

With respect to the above-mentioned reinforcement of the fusion spliced part, the above-mentioned Japanese Unexamined Patent Publication Hei11(1999)-52163 discloses the technique in which the generation of a bending force on the optical fibers at the time of heat shrinking can be eliminated by exposing the reinforcing rod 8 from both ends of the heat shrinking tube 6. Further, Japanese Unexamined Patent Publication Hei09(1997)-21926 discloses the technique in which in view of a fact that at the time of protecting the fusion slicing portion with the protective member 5, when the fusion spliced part is protected and fixed in a state that the optical fibers are bent, this becomes a cause of the increase of transmission loss and hence, the protective member 5 is heated while adding a fixed tension to the optical fibers 1.

When the protective member 5 which covers the fusion spliced part 4 of the optical fiber is placed on and is heated by the heating platform 9 of the heating mechanism 11, as also indicated in Japanese Unexamined Patent Publication Hei09(1997)-21926, it is necessary to fix by clamping the optical fibers 1 which are exposed from both sides of the protective member 5 using the optical fiber clamping mechanisms such that they are not moved. In this case, a support height of the optical fibers 1 is set substantially equal to a support height of the fusion spliced part. For example, with respect to the protective member 5 which is used in the single optical fiber shown in FIG. 4A, the protective member 5 is supported such that the optical fibers 1 are supported on the heated heating platform 9 substantially linearly and a support height thereof is set to D1.

However, in the fusion splicing of the optical fibers, versatile connection modes ranging from a single optical fiber mode to an optical fiber ribbon mode are adopted and, at the same time, with respect to the collective fusion splicing of the optical fibers, the collective splicing in a wide range from 2 fibers to 16 fibers or 24 fibers has been put into practice. When the number of the optical fibers is increased, a size of the reinforcing rod 8 is increased and hence, an outer diameter of the protective member 5 is also increased. Accordingly, with respect to the protective member 5 which is used in the optical fiber ribbon shown in FIG. 4B, the support height of the optical fibers 1'from the heating platform 9 assumes D2 which is higher than the support height D1 shown in FIG. 4A. On the other hand, with respect to the optical fiber clamping mechanisms which clamp and fix the optical fiber 1', usually, the height position of the optical fiber clamping mechanisms with respect to the heating platform 9 is fixed. In both of Japanese Unexamined Patent Publication Hei11(1999)-52163 and Japanese Unexamined Patent Publication Hei09(1997)-21926, no consideration has been made with respect to such difference in the support height.

FIGS. 5A and 5B are views showing an operational state of the device of reinforcing the optical fiber fusion spliced part. In the drawing, symbol 11 indicates a heating mechanism, symbol 12 indicates optical fiber clamping mechanisms and Y indicates a void. When the protective member 5 becomes large (is increased in size) due to the reinforcement of the fusion spliced part of the optical fiber ribbon 1', the support height of the fusion spliced part of the optical fibers is set larger than the support height of the optical fibers due to the optical fiber clamping mechanisms 12 at both sides and hence, the optical fiber 1' is held in an upwardly projected state as shown in FIG. 5A. Accordingly, a portion of the optical fiber which is surrounded by a circle in FIG. 5A assumes a curved state.

When the protective member 5 is heated in such a state, as indicated in an enlarged manner in FIG. 5B, the heat shrinking tube 6 is shrunken in the radial direction and, when the heat fusing tube 7 is fused, the optical fiber ribbon 1' functions so as to impede the discharge of the inside air at both end portions of the reinforcing rod 8 and hence, there exists a possibility that the air remains in the inside of the fused resin as the void Y. The void Y which is left in the inside of the protective member 5 repeats expansion and shrinking due to the change of an outside temperature and this may impart the intermittent change of stress to the optical fibers thus leading to the disconnection. Further, the expansion of the void Y imparts a side pressure to the optical fiber thus lowering the transmission loss.

SUMMARY OF THE INVENTION

It is an object of the present invention to provide a device and a method for reinforcing an optical fiber fusion spliced part which can adjust support heights such that a fusion spliced part and optical fibers disposed at both sides of the fusion spliced part are arranged linearly even when a size of a protective film is changed.

A device for reinforcing ann optical fiber splice part, according to the present invention by covering the optical fiber fusion spliced part with a protective member and reinforcing the optical fiber fusion spliced part by shrinking the protective member by heating, comprises:

a heating mechanism for heating the protective member; and a pair of optical fiber clamping mechanisms which are arranged at both sides of the heating mechanism, wherein relative height positions of the heating mechanism and the optical fiber clamping mechanisms are configured to be changeable.

Further, a method for reinforcing an optical fiber fusion spliced part according to the present invention comprises:

covering the optical fiber fusion spliced part with a protective member;

holding the protective member by a heating mechanism;

supporting optical fibers at both sides which extend from the protective member by a pair of optical fiber clamping mechanisms which are arranged at both sides of the heating mechanism; and adjusting relative height positions of the heating mechanism and the optical fiber clamping mechanisms so that the optical fiber fusion spliced part and the optical fibers at the both sides are linearly supported; and reinforcing the optical fiber fusion spliced part by shrinking the protective member by heating

DETAILED DESCRIPTION OF THE INVENTION

Figure 1A:
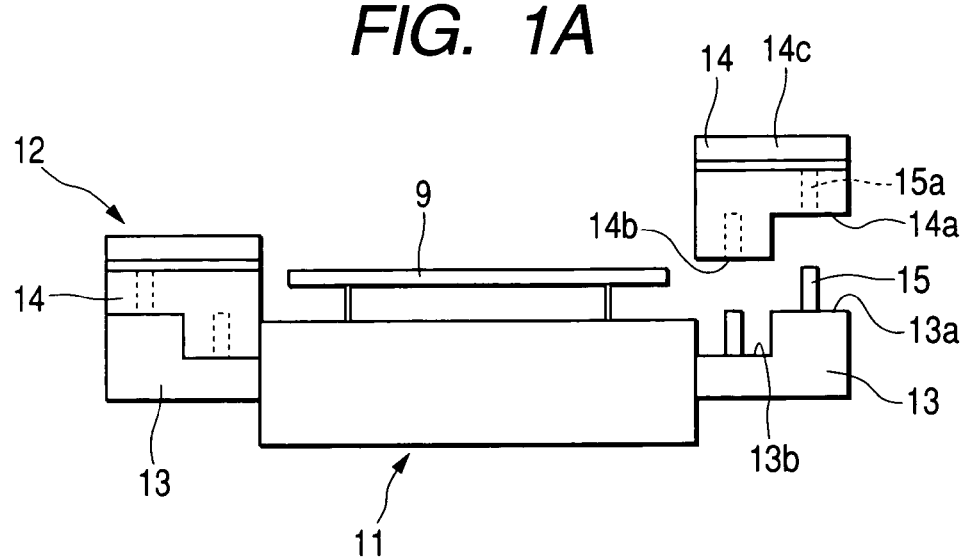
FIGS. 1A–1C are views for explaining the first embodiment of the present invention.
Figure 1B:
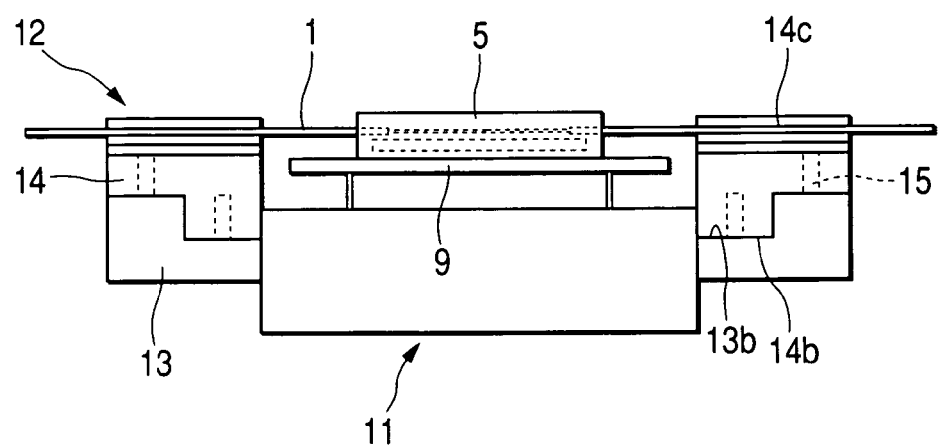
Figure 1C:
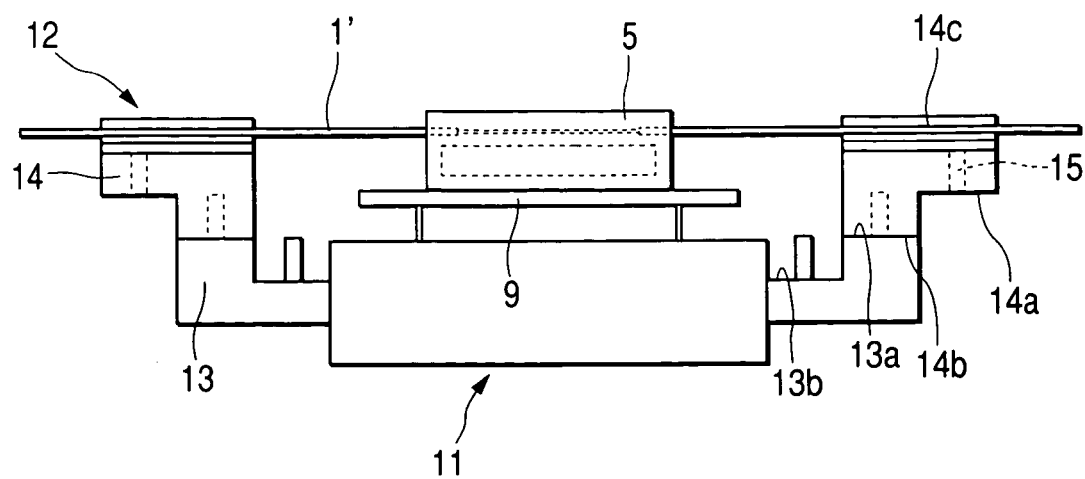

A first embodiment of the present invention is explained in conjunction with FIG. 1. FIG. 1(A) is a view showing an optical fiber fusion spliced part reinforcing device in an inoperable state, FIG. 1B is a view showing the optical fiber fusion spliced part reinforcing device in a first operable state, and FIG. 1C is a view showing the optical fiber fusion spliced part reinforcing device in a second operable state. In the drawing, symbols 1, 1' indicate optical fibers, symbol 5 indicates a protective member, symbol 9 indicates a heating platform, symbol 11 indicates a heating mechanism, symbol 12 indicates optical fiber clamping mechanisms, symbol 13 indicates clamp bases, symbols 13a, 13b indicate stepped portions, symbol 14 indicates clamp blocks, symbols 14a, 14b indicate stepped portions, symbol 14c indicates clamp means, symbol 15 indicates coupling pins, and symbol 15a indicates coupling holes.

The optical fiber fusion splice reinforcing device according to the present invention includes, in the same manner as the related art, the heating mechanism 11 and the optical fiber clamping mechanisms 12. The heating mechanism 11 heats the protective member 5 which covers the fusion spliced part of the optical fiber. The optical fiber clamping mechanisms 12 clamp and fix the optical fibers 1, 1' which are projected from both sides of the protective member 5. The heating mechanism 11 includes the heating platform 9 on which the protective member 5 is mounted and an accommodation groove or the like which facilitates holding of the protective member 5 may be formed in an upper surface of the heating platform 9. Further, the protective member 5 which is placed on an upper portion of the heating platform 9 may be covered with a lid member such as a halved sleeve which reduces the radiation of heat.

The optical fiber clamping mechanism 12 includes, for example, the clank base 13 and the clank block 14 and a coupling portion between them is formed of stepped portions having a step-like shape. The high stepped portion 13a and the low stepped portion 13b are formed at the clamp base 13 side, while the low stepped portion 14a and the high stepped portion 14b which conform with these stepped portions 13a, 13b are also formed in the clamp block 14b. The clamp bases 13 are fixedly mounted on both sides of the heating mechanism 11, wherein the clamp blocks 14 are replaceably and selectively mounted on the clamp base 13 using coupling pins 15.

Although coupling holes 15a which allow an insertion of the coupling pins 15 are formed in the clamp block 14 side, the coupling pin 15 may be fixed to the clamp block 14 side and the coupling holes 15a may be formed in the clamp base 13 side. Although the coupling pins 15 are fixed to the clamp base 13 side in the example shown in the drawing, the coupling pin 15 may be fixed to the clamp block 14 side. Further, coupling between the clamp base 13 and the clamp block 14 may use coupling means which adopts magnets or the like besides the pin coupling shown in the drawing.

Further, on upper surfaces of the clamp blocks 14, clamp means 14c which replaceably clamp and fix the optical fibers 1, 1' are formed. The clamp means 14c may be formed of, for example, various well-known structure including the structure which pushes the optical fiber by closing a hinged open/close arm or the structure which laminates a rubber plate to a clamping portion as described in Japanese Unexamined Patent Publication Hei09(1997)-21926.

FIG. 1B indicates the first using mode of the optical fiber fusion spliced part reinforcing device having the above-mentioned constitution, wherein an outer diameter of the protective member 5 for reinforcement is assumed to have a relatively small outer diameter. In this case, the clamp blocks 14 are coupled to the clamp base 13 sides using the coupling pins 15 such that the high stepped portions 14b of the clamp blocks 14 conform to the low stepped portions 13b of the clamp base 13 side. As a result, the clamp height of the optical fiber 1 can be supported linearly such that the clamp height of the optical fibers 1 assumes a height which is substantially equal to a height of the optical fiber fusion spliced part in the inside of the protective member 5 which is placed on the heating platform 9. Here, at the time of fixing the optical fibers 1 using the clamp means 14c, it is preferable to clamp and fix the optical fibers 1 such that slackening of the optical fiber 1 is not generated by applying a tension to the optical fiber 1.

FIG. 1C shows a second using mode and, for example, shows a case in which the optical fiber ribbon 1' is used. Compared to the protective member 5 for reinforcement shown in FIG. 1B, an outer diameter of the protective member 5 for reinforcement is assumed to have a relatively large outer diameter. In this case, by changing the position of the clamp blocks 14, the clamp blocks 14 are coupled to the clamp base 13 sides using the coupling pins 15 such that the high stepped portions 14b of the clamp blocks 14 conform to the high stepped portions 13a of the clamp base 13 side. Accordingly, there arises a situation that the low stepped portions 13b of the clamp base 13 side and the low stepped portions 14a of the clamp blocks 14 side are not used. As a result, it is possible to set the height position of the clamp means 14c of the clamp blocks 14 higher than the corresponding height position in the case shown in FIG. 1B and hence, even when the outer diameter of the protective member 5 is increased so that the support height of the fiber fusion spliced part is elevated, it is possible to align the support height of the optical fibers 1, 1' with the support height of fiber fusion spliced part.

Here, by setting the support height of the optical fibers 1, 1' in conformity with the outer diameter of the protective member 5 which is preliminarily used and preparing several types of clamp bases 13 or the clamp blocks 14 which conform to the set value, it is possible to make the optical fibers 1, 1' cope with a plurality of protective members. Further, although the case in which the stepped portions having two steps is illustrated in FIGS. 1A–1C, by forming the stepped portions having a plurality of finer steps, it is possible to perform the adjustment of the height position gradually.

Figure 2A:
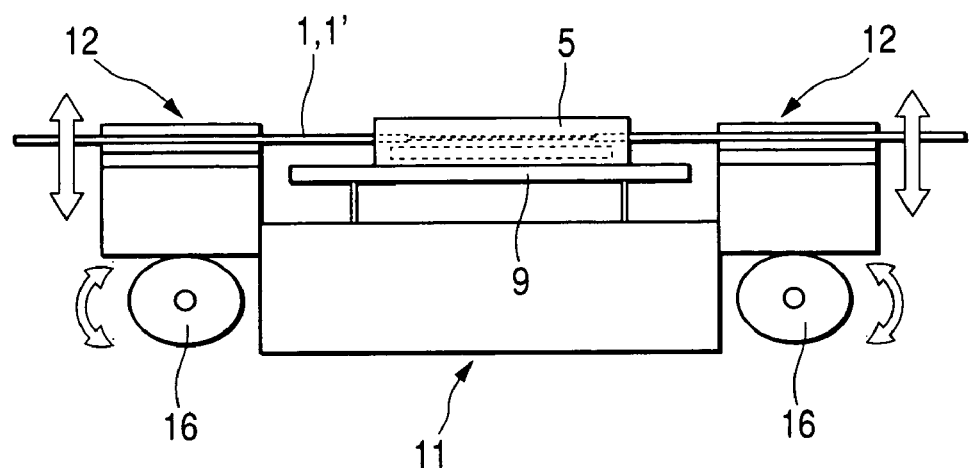
FIGS. 2A–2B a reviews for explaining the second embodiment of the present invention.
Figure 2B:
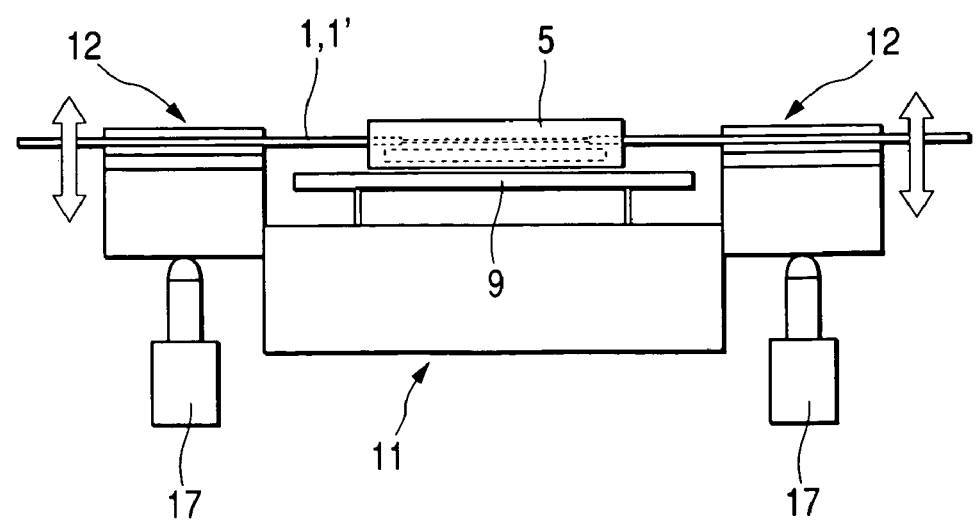

FIG. 2A and FIG. 2B are views for explaining the second embodiment, wherein FIG. 2A is a view showing an example in which the height adjustment of optical fiber clamping mechanisms is performed using cams and FIG. 2B is a view showing an example in which the height adjustment of optical fiber clamping mechanisms is performed using micrometers. In the drawing, symbol 16 indicates cam members and symbol 17 indicates micrometers. With respect to other symbols, symbols which are equal to the symbols used in FIGS. 1A–1C are used and hence, their explanation is omitted.

The embodiment shown in FIG. 2 is characterized in that the optical fiber clamping mechanisms 12 which are arranged at both sides of the heating mechanism 11 are movable in the up-and-down direction with respect to the heating mechanism 11. The clamping mechanisms 12 per se are equal to the clamping mechanisms 12 explained in conjunction with FIGS. 1A–1C and the clamping mechanisms 12 are moved and are adjusted in the up-and-down direction using the cam members 16 in FIG. 2A. The cam member 16 is formed of an eccentric cam or a constant velocity cam and it is possible to adjust the optical fiber clamping mechanisms 12 at an arbitrary height by driving a cam shaft using a motor. In an example which uses the micrometers shown in FIG. 2B, by driving the micrometers using a motor, it is possible to perform the fine adjustment and hence, the highly accurate height adjustment can be realized.

Figure 3A:
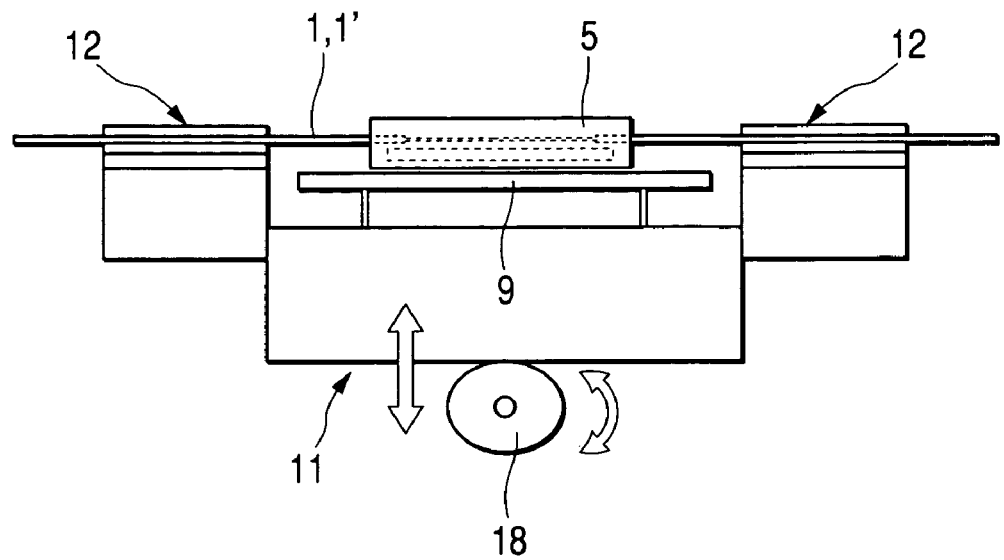
FIGS. 3A–3B views for explaining the third embodiment of the present invention.
Figure 3B:
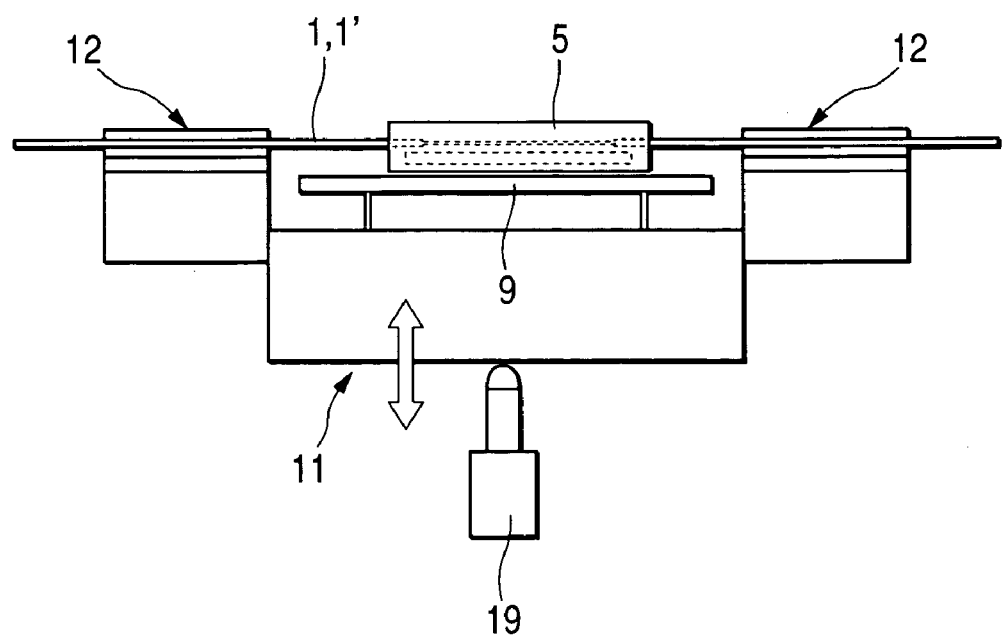
Figure 4A:
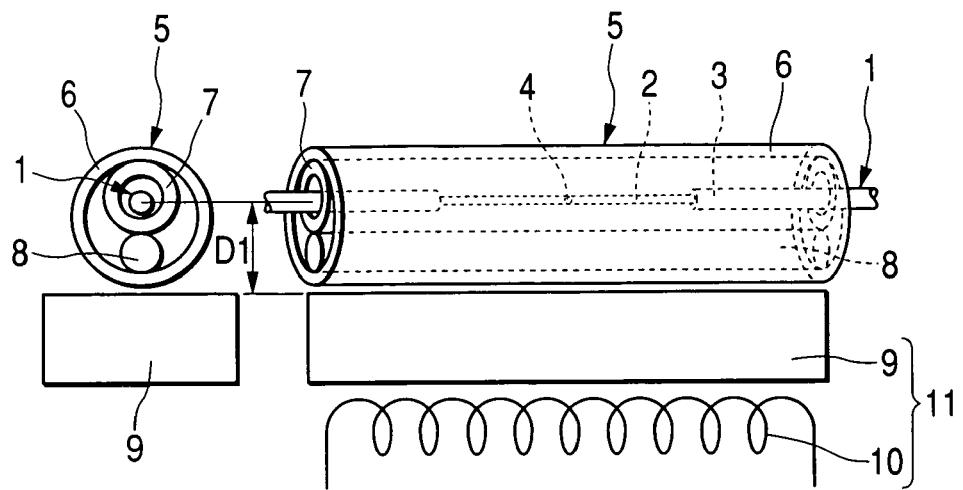
FIGS. 4A–4B are views for explaining a related art.
Figure 4B:
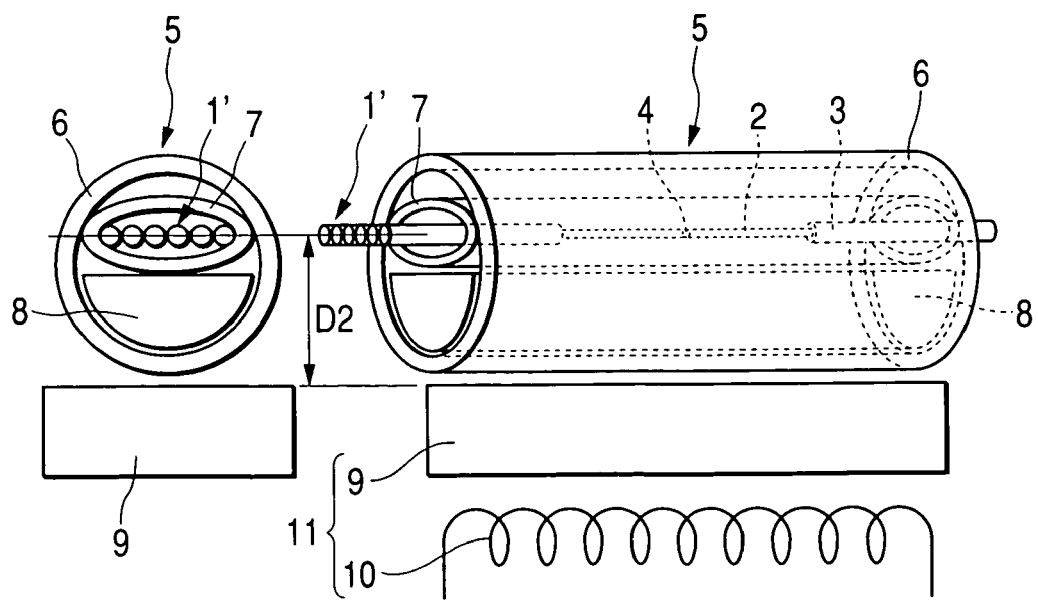
Figure 5A:
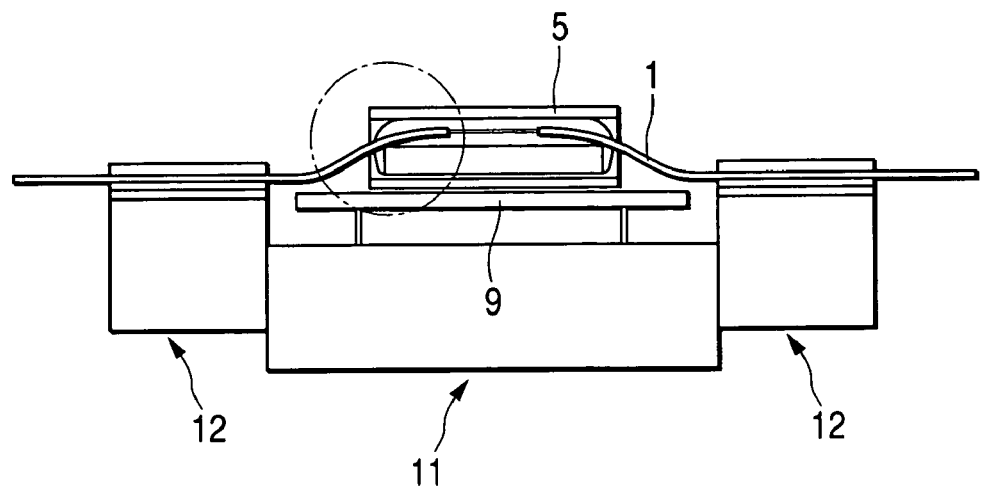
FIGS. 5A–5B are views for explaining a problem of the related art to be solved.
Figure 5B:
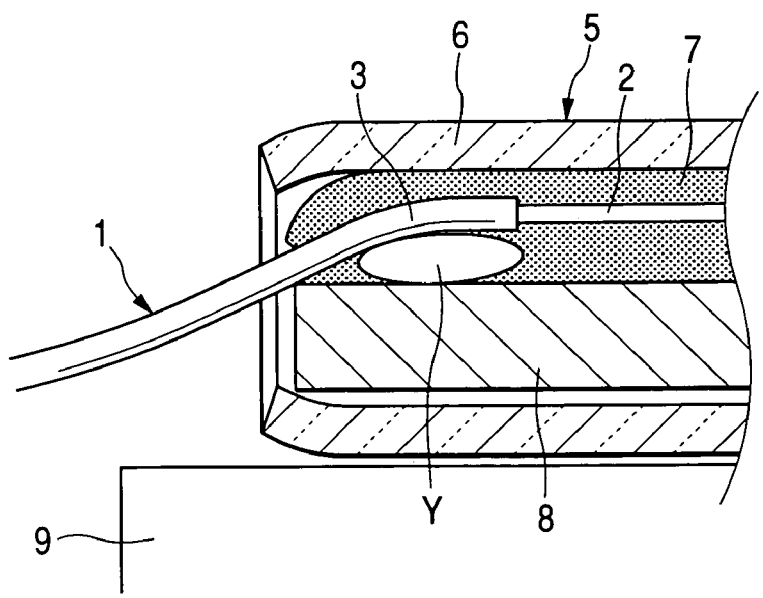

FIG. 3A and FIG. 3B are views for explaining the third embodiment, wherein FIG. 3A is a view which shows an example in which the height adjustment of the optical fiber clamping mechanisms is performed using a cam and FIG. 3B is a view which shows an example in which the height adjustment of the optical fiber clamping mechanisms is performed using a micrometer. In the drawing, symbol 18 indicates a cam member and symbol 19 indicates a micrometer. With respect to other symbols, symbols which are equal to the symbols used in FIGS. 1A–1C are used and hence, their explanation is omitted.

The embodiment shown in FIGS. 3A–3B is, contrary to the second embodiment in which the optical fiber clamping mechanisms 12 which are arranged at both sides of the heating mechanism 11 are configured to be movable in the up-and-down direction with respect to the heating mechanism 11, characterized by the constitution in which the heating mechanism 11 side is movable in the up-and-down direction. Here, the optical fiber clamping mechanisms 12 are, in the same manner as the first embodiment, arranged in a fixed manner. In FIG. 3A, the whole heating mechanism are movably adjusted in the up-and-down direction using the cam member 18. The cam member 18 is, in the same manner as the case illustrated in FIG. 2A, formed of an eccentric cam or a constant velocity cam and the heating mechanism 11 can be adjusted at an arbitrary height by driving a cam shaft using a motor. In the example which uses the micrometer shown in FIG. 3B, in the same manner as the case illustrated in FIG. 2B, by driving the micrometer 19 using a motor, it is possible to perform the fine adjustment control and hence, the highly accurate height adjustment can be realized.

In both embodiments illustrated in FIGS. 2A–2B and FIGS. 3A–3B, the height of the position of the heating platform 9 which supports the protective member 5 which covers the fusion spliced part and the support height of the optical fibers which project from both sides of the protective member 5 can be finely adjusted and hence, it is possible to support the optical fibers substantially linearly. Further, the adjustment can be performed by motor driving and hence, the highly accurate automatic adjustment can be realized. Further, since the protective member 5 is shrunken by heating, when heating is started, the protective member 5 assumes a state in which the protective member 5 is floated from the heating platform 9 whereby there exists a possibility that the protective member 5 deflects downwardly from the position of the optical fibers at both sides which are clamped and fixed. Accordingly, there may be a case that it is necessary to readjust the height position of the optical fibers in conformity with shrinkage or expansion of the protective member 5. In such a case, according to the embodiments shown in FIGS. 2A–2B and FIGS. 3A–3B, the fine adjustment can be also performed continuously and hence, these embodiments can easily cope with such a case.

Here, although the above-described optical fiber fusion spliced part reinforcing device has been explained as a unitary device, the optical fiber fusion spliced part reinforcing device may be incorporated into an optical fiber fusion splice device, or may be assembled close to the optical fiber fusion splice device so as to efficiently perform the fusion splice step and the reinforcement step as a series of steps.

As has been explained heretofore, according to the present invention, even when the size of the protective member of the optical fiber fusion spliced part is changed, it is possible to perform the heat treatment in the state that the support height of the fusion spliced part and the support height of the optical fibers which are arranged at both sides of the fusion spliced part can be approximately arranged linearly. As a result, it is possible to perform the reinforcement without generating bending of optical fibers and without leaving voids in the protective member even when the diameter of the protective member is narrowed and the adhesive agent inside the protective member is cured.

What is claimed is:

1. A device for reinforcing an optical fiber fusion spliced part by covering the optical fiber fusion spliced part with a protective member and reinforcing the optical fiber fusion spliced part by shrinking the protective member by heating, said device comprising:
    a heating mechanism for heating the protective member; and
    optical fiber clamping mechanisms which are arranged at both sides of the heating mechanism,
    wherein relative height positions of the heating mechanism and the optical fiber clamping mechanisms are configured to be changeable.

2. A device according to claim 1, wherein each of the optical fiber clamping mechanisms has a base member having at least two stepped portions and a block member having at least two stepped portions, and the optical fiber clamping mechanisms are configured to be capable of selecting a support height of optical fibers by changing a coupling position of base members and block members.

3. A device according to claim 1, wherein the optical fiber clamping mechanisms have a drive unit with a cam and the optical fiber clamping mechanisms are configured to be capable of changing a support height of optical fibers by the drive unit.

4. A device according to claim 1, wherein the optical fiber clamping mechanisms has a drive unit with a micrometer and the optical fiber clamping mechanism are configured to be capable of changing a support height of optical fibers by the drive unit.

5. A device according to claim 1, wherein the heating mechanism has a drive unit with a cam and the heating mechanism is configured to be capable of changing a support height of the protective member by the drive unit.

6. An optical fiber fusion spliced part reinforcing device according to claim 1, wherein the heating mechanism has a drive unit with a micrometer cam and the heating mechanism is configured to be capable of changing a support height of the protective member by the drive unit.

7. A method for reinforcing an optical fiber fusion spliced, said method comprising:
    covering the optical fiber fusion spliced part with a protective member;
    holding the protective member by a heating mechanism;
    supporting optical fibers at both sides which extend from the protective member by optical fiber clamping mechanisms which are arranged at both sides of the heating mechanism; and
    adjusting relative height positions of the heating mechanism and the optical fiber clamping mechanisms so that the optical fiber fusion spliced part and the optical fibers at the both sides are linearly supported; and
    reinforcing the optical fiber fusion spliced part by shrinking the protective member by heating.

8. A device according to claim 1, wherein each optical fiber clamping mechanism comprises a clamp base and a clamp block with a coupling portion formed therebetween, said coupling portion being formed of stepped portions.

9. A device according to claim 8, wherein
    the clamp base comprises a first higher stepped portion and a second lower stepped portion; and
    the clamp block comprises a first lower stepped portion and a second higher stepped portion which conform with the first and second stepped portions of the clamp base, respectively.

10. A device according to claim 9, wherein
    the clamp base is fixedly mounted on both sides of the heating mechanism and
    the clamp block is replaceably and selectively mounted on the clamp base.

11. A device according to claim 10, wherein the clamp block is replaceably and selectively mounted on the clamp base by way of coupling pins formed in the clamp block and coupling holes formed in the clamp base.

* * * * *